US011223702B2

(12) United States Patent
Rimac et al.

(10) Patent No.: US 11,223,702 B2
(45) Date of Patent: Jan. 11, 2022

(54) METHOD FOR MIGRATION OF VIRTUAL NETWORK FUNCTION

(71) Applicant: Alcatel Lucent, Nozay (FR)

(72) Inventors: Ivica Rimac, Stuttgart (DE); Leonhard Nobach, Stuttgart (DE); Volker Hilt, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/086,856

(22) PCT Filed: Mar. 17, 2017

(86) PCT No.: PCT/EP2017/056349
§ 371 (c)(1),
(2) Date: Sep. 20, 2018

(87) PCT Pub. No.: WO2017/162531
PCT Pub. Date: Sep. 28, 2017

(65) Prior Publication Data
US 2019/0089814 A1 Mar. 21, 2019

(30) Foreign Application Priority Data
Mar. 24, 2016 (EP) .................................... 16290053

(51) Int. Cl.
*G06F 15/16* (2006.01)
*G06F 9/54* (2006.01)
(Continued)

(52) U.S. Cl.
CPC .......... *H04L 67/34* (2013.01); *H04L 41/0813* (2013.01); *H04L 49/90* (2013.01); *H04L 67/1031* (2013.01)

(58) Field of Classification Search
CPC ............................... G06F 9/4856; H04L 67/34
(Continued)

(56) References Cited

U.S. PATENT DOCUMENTS

| 10,404,579 B1* | 9/2019 | Biemueller ............. H04L 61/25 |
| 2007/0180436 A1* | 8/2007 | Travostino ............ G06F 9/4856 |
| | | 717/138 |

(Continued)

FOREIGN PATENT DOCUMENTS

| CN | 101859263 A | 10/2010 |
| CN | 104660553 A | 5/2015 |

(Continued)

OTHER PUBLICATIONS

International Search Report and Written Opinion dated May 31, 2017 in International Application No. PCT/EP2017/056349.

(Continued)

*Primary Examiner* — Hamza N Algibhah
(74) *Attorney, Agent, or Firm* — Harness, Dickey & Pierce, P.L.C.

(57) ABSTRACT

A method for migration of a virtual network function, VNF, from a source node to a destination node includes receiving by the destination node a snapshot of a state of the virtual network function implemented by the source node and receiving by the destination node state update elements encoding a change of the state of the virtual network function implemented by the source node caused by processing of one or more data packets received by the source node since the snapshot.

18 Claims, 1 Drawing Sheet

(51) Int. Cl.
  *H04L 29/06* (2006.01)
  *H04L 29/08* (2006.01)
  *H04L 12/24* (2006.01)
  *H04L 12/861* (2013.01)
(58) Field of Classification Search
  USPC .......................................................... 709/221
  See application file for complete search history.

(56) References Cited

U.S. PATENT DOCUMENTS

| | | | | |
|---|---|---|---|---|
| 2011/0320556 A1* | 12/2011 | Reuther | ................ | G06F 9/4856 709/213 |
| 2014/0215459 A1* | 7/2014 | Tsirkin | ................ | G06F 9/45558 718/1 |
| 2015/0052282 A1* | 2/2015 | Dong | ..................... | G06F 13/32 710/308 |
| 2015/0205688 A1* | 7/2015 | Haid | ................... | G06F 11/1484 709/212 |
| 2015/0234617 A1* | 8/2015 | Li | ......................... | G06F 3/0647 711/114 |
| 2015/0237132 A1* | 8/2015 | Antony | .............. | H04L 67/1095 709/224 |
| 2015/0312118 A1* | 10/2015 | Behera | .................. | H04L 45/26 370/241 |
| 2015/0324227 A1* | 11/2015 | Sizemore | ................. | G06F 9/48 718/1 |
| 2015/0378771 A1* | 12/2015 | Tarasuk-Levin | .... | G06F 9/45558 718/1 |
| 2015/0378783 A1* | 12/2015 | Tarasuk-Levin | ...... | G06F 16/273 718/1 |
| 2016/0019107 A1* | 1/2016 | North | .................. | G06F 11/0793 714/19 |
| 2016/0055019 A1* | 2/2016 | Thakkar | .............. | G06F 9/45558 718/1 |
| 2016/0070588 A1 | 3/2016 | Zhang et al. | | |
| 2016/0077935 A1* | 3/2016 | Zheng | ................ | G06F 11/2028 714/4.12 |
| 2016/0196158 A1* | 7/2016 | Nipane | ............... | G06F 9/45558 718/1 |
| 2016/0277509 A1* | 9/2016 | Qiang | ..................... | H04L 67/16 |
| 2016/0299773 A1* | 10/2016 | Dong | .................. | G06F 9/45558 |
| 2016/0378622 A1* | 12/2016 | Ren | ........................ | G06F 11/203 714/4.11 |
| 2017/0017512 A1* | 1/2017 | Csatari | .................. | G06F 9/4856 |
| 2018/0018193 A1* | 1/2018 | Yabushita | ............... | G06F 11/20 |
| 2018/0026902 A1* | 1/2018 | Tang | .................. | H04L 49/9047 370/392 |
| 2018/0136971 A1* | 5/2018 | Dong | .................. | G06F 9/45558 |
| 2018/0191838 A1* | 7/2018 | Friedman | .............. | H04L 67/148 |
| 2018/0246751 A1* | 8/2018 | Dong | ...................... | G06F 9/505 |

FOREIGN PATENT DOCUMENTS

| | | |
|---|---|---|
| CN | 105429776 A | 3/2016 |
| EP | 2782009 | 9/2014 |
| JP | 2011-39790 A | 2/2011 |
| WO | WO-2015/135611 | 9/2015 |

OTHER PUBLICATIONS

Network Functions Virtualisation; Virtualisation Requirements Comments from SWA WG; GS NFV-0012, European Telecommunications Standards Institute (ETSI), 650, Route Des Lucioles; F-06921 Sophia-Antipolis ; France, vol. IDS—NFV, No. V0.1.8, Aug. 23, 2013 (Aug. 23, 2013), pp. 1-17, XP014229411, Chapter 5.8, p. 10.
Christopher Clark et al., "Live Migration of Virtual Machines", USENIX Association, NSDI'05 Proceedings of the 2nd conference on Symposium on Networked Systems Design & Implementation, vol. 2, May 2005, pp. 273-286, (https://dl.acm.org/citation.cfm?id=1251223).
Konomi Mochizuki, et al., "Relocation Method of Virtual Edge VNFs to Shorten Service Disconnection Time", IEICE Technical Report, vol. 115, No. 326, Nov. 19, 2015, pp. 1-6.
Japanese Office Action dated Jun. 20, 2019 in Japanese Application No. 2018-549981.
Office Action dated Jan. 28, 2021 in Chinese Application No. 201780030637.7.
'Network Functions Virtualisation (NFV); Virtualisation Requirements' *ETSI GS NFV 004*, V1.1.1, 2013, pp. 1-17.
'Telecommunication network technology' *Network Technology*, No. 6, 2014, pp. 10-13.

* cited by examiner

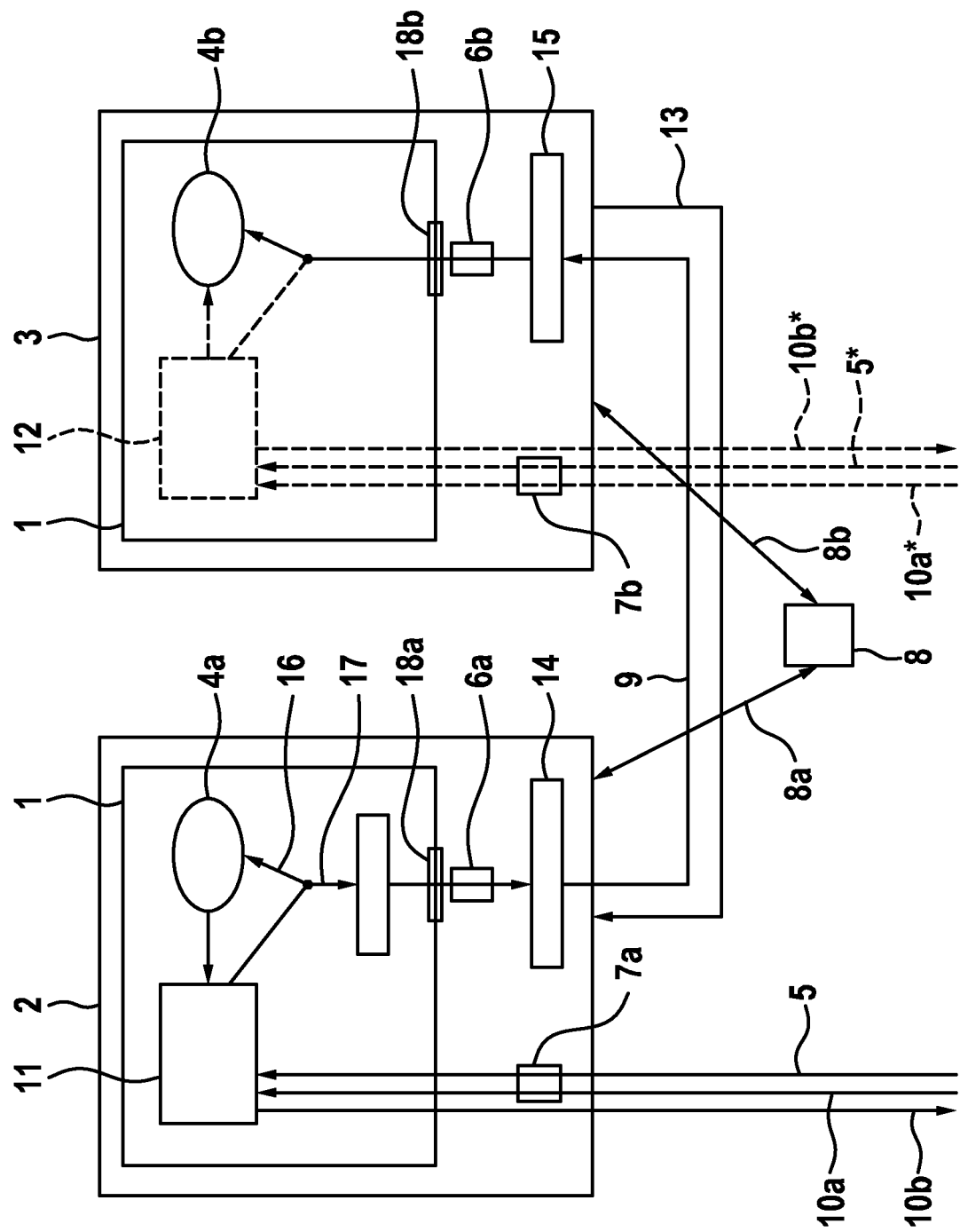

METHOD FOR MIGRATION OF VIRTUAL NETWORK FUNCTION

CROSS-REFERENCE TO RELATED APPLICATIONS

This application is a National Stage Application of International Application No. PCT/EP2017/056349, filed Mar. 17, 2017, which claims priority to European Application No. 16290053.4, filed on Mar. 24, 2016, the entire contents of each of which are incorporated herein by reference.

FIELD OF THE INVENTION

The invention is situated in the field of network technology and relates to a method and corresponding apparatus for migrating a virtual network function from a source node to a destination node.

BACKGROUND

Network Functions (NF) operate on the traffic in a network's data plane. They forward, alter, or make changes upon it. Examples for NFs are PPPoE Access Multiplexer (PPPoE=Point-to-Point Protocol over Ethernet), IDS (Intrusion Detection System), NAT (Network Address Translation), Firewall. Virtualized NFs (VNFs), as a specialization, run in a cloud infrastructure, instead of operating on dedicated hardware. Compared to a traffic forwarding element (e.g., an SDN, Software Defined Network, switch), these VNFs often require maintaining state to function correctly. For example, firewalls often maintain counters to identify an attack.

For reasons such as traffic or resource optimization, but not limited to, these network functions may need to be scaled out/in or be "relocated" to another location in a network. Additional instances of a VNF may be needed to cope with an increased demand, or instances may be consolidated to a smaller number when demand decreases. A VNF may be moved (fully or partly) within a datacenter, from one datacenter to another datacenter, or from a datacenter to the customer premises, e.g., to improve resource utilization or system performance.

When changing the allocation of a function, it is important to migrate the necessary service state from the previous to the new instances. VNFs are critical functions in a network service; interruptions and downtimes during their reallocation can result in severe packet loss and jitter, which deteriorates the quality of the service. In order not to reduce quality of experience, it is necessary to avoid interruption of the VNF's service by effectively managing the service state.

A current implementation referred to as OpenNF is a framework allowing a network function to split or merge several sessions, or completely transfer its state to other physical resources. The framework provides mechanisms to guarantee that no packet loss and no out-of-order packets are caused while an ongoing session and state transfer takes place. In the framework, the NFV controller plays a significant role in the datapath, its special task includes buffering packets that must not yet be delivered. The framework introduces a state classification, depending on dependencies of distinct datapath flows (sessions) and methods which filter sessions to return, delete or inject state which is related to the specified sessions. In OpenNF, the controller is heavily utilized by data plane tasks, such as packet buffering.

A further current implementation referred to as P2P-based OpenNF (Peer-to-Peer-based OpenNF), a data packet is processed not only by the original network function, it is duplicated and sent to the newly instantiated network function just to keep its state up-to-date. This causes a very large amount of redundant traffic and degrades the performance of the network, both on the network paths and the network buffers.

Therefore, it is an objective of the invention to provide a method for efficient migration of virtual network functions.

SUMMARY

The invention achieves this objective by a method for migration of a virtual network function, VNF, from a source node to a destination node. The destination node receives a snapshot of a state of the virtual network function implemented by the source node. Further, the destination node receives state update elements. State update elements encode a change of the state of the virtual network function which is implemented by the source node, wherein the change of the state is caused by the source node, more specifically the virtual network function of the source node, processing one or more data packets received by the source node since the snapshot has been made. A state of a function which implements a process might be defined as the point of the process at which the process has been arrived at a particular moment, for example at the moment when the state is determined. The determination of the state at a particular moment might be termed a snapshot of the state.

The invention achieves the aforementioned objective further by a source node which is adapted to transmit a snapshot of a state of a virtual network function implemented by the source node to a destination node and to transmit state update elements encoding a change of the state of the virtual network function implemented by the source node caused by processing of one or more data packets received by the source node since the snapshot.

The invention achieves the aforementioned objective further by a destination node which is adapted to receive a snapshot of a state of a virtual network function implemented by a source node and to receive state update elements encoding a change of the state of the virtual network function implemented by the source node caused by processing of one or more data packets received by the source node since the snapshot.

The invention achieves the aforementioned objective further by a computer program product which is adapted to execute the described method, when executed on a computer.

The method might be executed on software, hardware or combination thereof.

The use of the singular form does not exclude the plural. For example, while the method is described with reference to a virtual network function, it applies similarly on migration of two or more virtual network functions.

A virtual network function might be, for example a virtual IDS (virtual Intrusion Detection System), a virtual NAT (Network Address Translation) or a virtual Firewall.

A virtual function is preferably a function which is implemented on one or more computers, e.g. servers, in a cloud environment. Preferably, in a cloud environment, a function is implemented on one or more physical resources (computers, servers) which appear to a user as one resource, namely the virtual resource.

In a preferred embodiment, the destination node stores the state update elements which the destination node has received from the source node in a state update buffer implemented at the destination node.

In a preferred embodiment, a state update element is a state update byte vector, which might also be termed state update vector.

Preferably, a state update element, in particular a state update byte vector, is a data unit comprising a compact VNF-specific byte representation, which is produced by the VNF of the source node to transmit the change of the state of the virtual network to the destination node. Preferably, the state update element, in particular the state update vector, is transmitted using a transmission transport protocol, TCP. Preferably, the state update elements are transmitted sequentially.

In a preferred embodiment a state update element, in particular a state update byte vector, is a compact VNF-specific byte representation, which does not have a packet header structure.

In a further preferred embodiment, a state update element, in particular a state update byte vector, has a packet header structure and a packet payload. The packet payload carries the encoded information on the change of the state caused by a particular data packet when processed by the virtual network function implemented by the source node.

In a preferred embodiment, the destination node receives the state update elements from the source node directly, in particular without any controller involved in the datapath.

Preferably, the destination node stores the state update elements received from the source node in a state update buffer at the destination node.

Preferably, the feature "buffered state update elements (byte vectors)" refers to the state update elements (byte vectors) stored at the state update buffer at the destination node.

In a preferred embodiment, the virtual network function is initialised at the destination node based on the state snapshot.

In a preferred embodiment, the state of the virtual network function which is initialized at the destination node is updated based on the state update elements which are buffered at the destination node.

In a preferred embodiment, after the buffered state update elements, which are used for updating the state of the virtual network function initialized at the destination node, decrease below a predetermined threshold, the destination node signals to stop processing of data packets at the source node and additionally or alternatively to redirect one or more following data packets to the destination node.

Preferably the destination node signals to stop processing of data packets at the source node and/or to redirect one or more following data packets to the destination node, after the buffered state update elements at the destination node, which in particular are used for updating the state of the virtual network function initialized at the destination node, decrease below a predetermined threshold.

In a further preferred embodiment the destination node signals to stop processing of data packets at the source node and to redirect one or more following data packets to the destination node, after the state of the virtual network function initialized at the destination node has been updated with a predetermined amount of the buffered state update elements.

In a preferred embodiment, the destination node sends a message to the controller, which might be determined "redirect message", after the buffered state update elements, which are used for updating the state of the virtual network function initialized at the destination node, decrease below a predetermined threshold.

Furthermore, in a preferred embodiment, the destination node sends a message to the controller, which might be determined "redirect message", and/or the destination node signals to stop processing of data packets at the source node and additionally or alternatively to redirect one or more following data packets to the destination node, after the state of the virtual network function initialized at the destination node has been updated with a predetermined amount of the buffered state update elements.

Preferably, the predetermined amount of the buffered state update elements is determined by a quantity of the state update elements, in particular by comparing the number of buffered state update elements at the destination node with a predetermined threshold. In other words it is checked after every state update element taken out of the destination buffer for updating the state, if the current quantity of state update elements in the buffer of the destination node underruns/has become lower than a predetermined threshold. Preferably the predetermined threshold is a constant integer "d", where "d" can be configured to be 0 or any positive integer value.

In a preferred embodiment, by the above message (redirect message) the controller is caused to signal to the source node to stop processing of data packets at the source node.

In a preferred embodiment, by the above message (redirect message) the controller is caused to redirect following data packets to the destination node. The following data packets are data packets which follow the data packets which have been sent to the source node before the redirecting. Thus, as soon as the buffered state update elements, which are used for updating the state of the virtual network function initialized at the destination node, decrease below a predetermined threshold, the redirect message is sent from the destination node to the controller.

In more detail, in a preferred embodiment, after the buffered state update elements, which are used for updating the state of the virtual network function initialized at the destination node, decrease below a predetermined threshold, the destination node signals to the controller that the source node should stop processing of data packets. Preferably, the controller then signals to the source node to stop processing of data packets.

Further, preferably, the destination signals to the controller to redirect one or more data flows which have processed to the source node, more specifically by the virtual network function of the source node, to the destination node to be processed by the destination node, more specifically to the virtual network function of the destination node.

Preferably, the controller redirects the data flows which have been processed by the source node to the destination node. Preferably, packet loss is thereby avoided.

Preferably, the destination node first notifies to the controller that the state update buffer at the destination node is nearly empty. Preferably, the controller then programs the datapath elements to forward data traffic to the destination node.

In more detail, in a preferred embodiment, the controller injects a drain packet to the source node. A drain packet is defined as a packet which causes the source node to stop transmitting state update elements to the destination node. Preferably, upon receiving the drain packet, the source node closes the state update stream to the destination node. Preferably, thereby the destination node is notified about the end of state updates. Preferably, the destination node, more specifically the virtual network function implemented at the destination node, then can start processing packets. Preferably, thereby synchronization of the migration of the virtual network function from the source node to the destination node is implemented.

In a preferred embodiment, the (above described) redirect message is triggered by an underrun of predetermined buffered state update elements, which are used for updating the state of the virtual network function initialized at the destination node.

Preferably, the predetermined threshold in regard of the buffered state update elements is defined as an underrun of the state update buffer, preferably as an underrun of "d" state update elements, wherein "d" is a predefined parameter, e.g. 10, 100, 1000, 10000.

In a preferred embodiment, the predetermined threshold of the buffered state update elements which triggers the redirect message is defined as an underrun of the state update buffer, preferably as an underrun of "d" state update elements, wherein "d" is a predefined parameter, e.g. 10, 100, 1000, 10000.

In a preferred embodiment, the number of buffered state update elements is determined and compared to a predetermined threshold. Preferably, if the number of buffered state update elements underrun the predetermined threshold, e.g. 10, 100, 1000, 10000, the destination node signals to stop processing of data packets at the source node and additionally or alternatively to redirect one or more following data packets to the destination node and/or the destination node sends a message, in particular the redirect message, to the controller.

In a further preferred embodiment, the redirect message is triggered, if the quantity of the (currently) buffered state update elements at the destination node, which are used to update the state of the virtual network function initialized at the destination node, is considered low enough. In particular, it is noted that the predetermined quantity before switching over refers to the current elements in the state update buffer of the destination node, not to the totality of the transmitted state update elements.

In a preferred embodiment, after the controller redirects the data packets to the destination node, the destination node receives the data packets in a data packet buffer at the destination node. These data packets might be termed "following" data packets, because these data packets follow the last data packet(s) which have been directed to the source node before redirect.

In a preferred embodiment, the destination node stores the one or more following data packets in a data packet buffer at the destination node. Preferably, the storing starts before the redirection has started in order to avoid packet loss.

In a preferred embodiment, the destination node, more specifically the virtual network function at the destination node, processes the one or more following data packets as soon as all state update elements received from the source node and stored in the state update buffer at the destination node have been processed to update the virtual network function at the destination node.

In a preferred embodiment, the destination node starts processing of the (following) data packets stored in the data packet buffer at the destination node, after the state update buffer in which the state update elements received from the source node at the destination node have been buffered is empty, and further preferably if the destination node does not receive any state update elements from the source node any more.

In a preferred embodiment, the destination node, more specifically the virtual network function at the destination node, processes one or more of the one or more following data packets, while (/although) one or more state update elements are yet to be expected to be transmitted from the source node to the destination node.

In a preferred embodiment the determination to process one or more following data packets by the virtual network function at the destination node, while one or more state update elements are yet to be expected to be transmitted from the source node to the destination node, is based on a determination if the one or more following data packets can be processed without harming the in-order process. In other words, in a preferred embodiment it is determined for every data packet which is received by the destination node and stored in the data packet buffer at the destination node, if the data packet can be processed without harming the in-order process.

In more detail, in a preferred embodiment, the determination to process one or more data packets stored in the data packet buffer at the destination node, while (/although) one or more state update elements are yet to be expected to be transmitted from the source node to the destination node, is based on a comparison of the sequence numbers of the one or more data packets stored in the data packet buffer at the destination node with the respective sequence numbers of a TCP flow to which the one or more data packets belong.

Preferably, the data packets are received and stored at the destination node, before the state update element stream from the source node to the destination node has been completed, i.e. while the source node is still transmitting state update elements to the destination node. For every data packet entering the data packet buffer of the destination node, the virtual network function determines, if the data packet can be processed without harming the in-order process. In case the virtual network function determines that the packet can be processed without harming the in order process, the packet is processed without waiting for the state update stream to close.

Preferably, the determination by the destination node if an incoming data packet can be processed without harming the in-order process, is implemented by a TCP sequence number. For example, in a TCP stream, the virtual network function of the destination node remembers (stores) the last sequence number of a particular flow seen, and returns "true" to the question, whether the data packet can be processed without harming the in-order process, in case the entering data packet's sequence number is the next one to be expected. In the latter case the data packet is processed without waiting for the state update stream to close. Therefore, the delay can be decreased while the dataplane at the source node is drained.

In a preferred embodiment, the migration is a complete migration. Therefore, a totality of data packet traffic processed before the migration by the source node is redirected to the destination node to be processed by the destination node.

In particular, it is noted that the one or more data packets (which are received by the source node before redirect and by the destination node after redirect) belong to the one or more data flows or more generally to the data packet traffic mentioned herein.

In a preferred embodiment, the migration is a partial migration. Therefore, only a part of the data packet traffic processed before the migration by the source node is redirected to the destination node to be processed by the destination node.

Preferably, in a partial migration, the virtual machine at the source node during snapshot serialization omits state that does not need to be transferred to the destination node. In other words, the source node when implementing the state snapshot at the virtual machine of the source node only serializes state which is relevant for the destination node and which is therefore destined to be transferred to the destination node.

Preferably, in a partial migration, state updates are only announced (transmitted to the destination node) if they belong to the state which has been included in the serialized snapshot. In other words, the source node transmits state update elements only for the state that is relevant for the destination node and which has therefore been serialized in the snapshot.

Preferably, in a partial migration, the controller redirects only part of the data flows to the destination node, preferably data flows which are relevant for the destination node, because they have been determined to be processed by the destination node instead of by the source node.

Preferably, in a partial migration, the source node, in particular upon receiving the drain packet, does not stop the dataplane operation. In other words, the source node continues to process data flows which have not been redirected to the destination node.

In a preferred embodiment, the migration of a virtual network function is a merge of the virtual network function at the source node with the virtual network function of the destination node.

Preferably, a merge of the virtual network function at the source node with the virtual network function of the destination node is based on a merge of the state of the virtual network function of the source node and the state of the virtual network function of the destination node.

Preferably, in a merge of states, a snapshot of the virtual network function of the source node is implemented and a snapshot of the virtual network function of the destination node is implemented and the two snapshots are merged.

Further, preferably, the state update elements of the virtual machine at the source node and the state update elements of the virtual machine at the destination node are merged.

Preferably, the merge of the state and/or of the state update elements of the virtual machines are merged by the dataplane, in particular by a dataplane thread. For example, the dataplane thread merges entries of a respective table reflecting the state (changes), wherein the table entries are merged with low priority and the thread is interrupted, if other workload of the dataplane (which has been assigned a higher priority) is available (is to be processed). Thereby, preferably, the operational dataplane of the destination node is not interrupted. In a preferred embodiment, the destination node receives one or more of the state update elements before receiving the snapshot of the state.

In particular, reception of the one or more state update elements and reception of the snapshot of the state does not need to be in-order. Preferably, the snapshot transfer and state update transfer happen simultaneously (preferably via two TCP connections), but the state updates are buffered and installed afterwards.

In a preferred embodiment, the source node is implemented by a first physical node and the destination node is implemented by a second physical node, preferably the second physical node being different from the first physical node.

In a further preferred embodiment, bare-metal servers without virtualization are used to implement the source node by a first physical node and the destination node by a second physical node.]

In a preferred embodiment, the virtual network function is implemented at the source node by a virtual source instance and at the destination node by a virtual destination instance.

In a preferred embodiment, the destination node sends one or more acknowledgement messages to the source node to confirm one or more of reception of the state snapshot, reception of the state update elements and migration of the virtual network function from the source node to the destination node.

In a preferred embodiment, the state update elements are processed by stream compression at the source node and processed by stream decompression at the destination node.

In a preferred embodiment, the state update elements are formatted into the TCP/SCTP (Transmission Control Protocol/Stream Control Transmission Protocol) at the source node and received within the TCP/SCTP protocol at the destination node.

BRIEF FIGURE DESCRIPTION

The features and advantages of the invention will be described in more detail with reference to FIG. 1 depicting a schematic view of elements and steps of a method for migrating a virtual network function from a source node to a destination node.

DETAILED DESCRIPTION

The following detailed description of preferred embodiments is for illustrative reasons only and the scope of the invention is defined by the claims. The preferred embodiments as described in detail below such as in the general description above are not exclusive, but might be combined resulting in further preferred embodiments.

FIG. 1 depicts a schematic overview of elements and steps of the method for migrating a virtual network function (VNF) 1 implemented by the source node 2 from the source node 2 to the destination node 3. At the source node 2, a snapshot of the state of the virtual network function 1 implemented at the source node 2 is made, preferably by the source node 2. The state of the virtual network function 1 at the source node 2 is stored in the state memory 4*a*. The virtual network function 1, e.g. a firewall, processes 11 one or more data flows 10*a* incoming to the source node 2 into data flows 10*b* outputted from the source node 2. The data flows 10*a* might be stored in data packet buffer 7*a* of source node 2 before being processed by the virtual network function 1 of source node 2. The state of the virtual network function 1 at the source node 2 monitored by the state snapshot reflects the point of the processing 11—by the virtual network function 1 implemented by the source node 2—of packets of the incoming data flows 10*a* into the outgoing data flows 10*b*. The data flows 10*a* consisting of a plurality of respective data packets are received by the source node 2 from a further network element, e.g. a client (not depicted), and are sent to another further network element, e.g. a server (not depicted). The state derived by the snapshot from the processing 11 is stored in state memory 4*a* at the source node 2. The source node 2 also transmits the state snapshot (or in other words the state determined by the snapshot) to the destination node 3 which accordingly receives the state snapshot from the source node 2. The destination node 3 stores the state of the virtual network function 1 received from the source node 2 in state memory 4*b* at the destination node 3. The making of the state snapshot at the source node 2 and the transmission of the state snapshot from the source node 2 to the destination node 3 is not explicitly depicted in FIG. 1 in order not to overload the figure.

In preferred embodiments, the source node 2 creates the state snapshot by letting the virtual network function 1 serialize its (internal) state, where concurrent writes to the state are redirected to other data structure regions, so that the state remains in its original form while snapshotting is conducted. In preferred embodiments, if partial migration is desired, only a part of the state is serialized this way, preferably by means of a mask which indicates the parts of the state to serialize (example of a mask: "flows with odd/even IP addresses").

Further, when a packet of an incoming data flow 10a is processed 11 at the source node 2, the state change caused by this processing 11 is transformed, in particular encoded 17, in a state update element, which is for example a state update byte vector. Preferably, the state change also modifies 16 the state stored in state memory 4a at the source node 2. Preferably, a state update element, in particular a state update byte vector, is a data unit comprising a compact VNF-specific byte representation, which is produced by the VNF of the source node 2 to transmit the change of the state of the virtual network to the destination node 3.

Preferably, the source node 2 starts to collect the state update elements, in particular the state update byte vectors, from the virtual network function 1 at the source node 2 right after the source snapshotting has started.

In a preferred embodiment, the source node 2 stores the state update elements, in particular the state update byte vectors, collected from the virtual network function 1 at the source node 2 in a state update buffer 6a of the source node 2, in particular before transmitting the state update elements, in particular the state update byte vectors, to the destination node 3. However, it is noted in that context that, unless otherwise indicated explicitly, when the feature "buffered state update elements or byte vectors" is used, the feature "buffered" refers to the buffering in the state update buffer 6b at the destination node 3 (see soon below).

The source node 2 transmits the state update elements to the destination node 3 which accordingly receives 9 the state update elements from the source node 2. Preferably, the state update elements are processed 14 at the source node 2 by stream compression (e.g. GZIP=GNU zip, GNU=Gnu's not Unix) and processed 15 at the destination node 3 by stream decompression. Preferably, the state update elements, preferably such as the state snapshot, are transmitted from the source node 2 to the destination node 3 according to the TCP/SCTP protocol.

The state update elements received at the destination node 3 from the source node 2 are stored at the destination node 3 in state update buffer 6b of the destination node 3. In particular, the state of the virtual network function 1 is initialized at the destination node 3 based on the state snapshot and is updated based on the state update elements buffered at the state update buffer 6b. Thus preferably, the state update elements are buffered at the destination node 3, until the virtual network function 1 has been initialized at the destination node 3 with the snapshot and then used to update the state.

Thus, preferably, the state of the virtual network function 1 which is received in form of the state snapshot from the source node 2 by the destination node 3 is stored in the state memory 4b at the destination node 3. Based on this state stored in the state memory 4b, the virtual network function 1 is initialized at the destination node 3. Then the state of the virtual network function 1 at the destination node 3 (the state being stored in state memory 4b) is updated by the state update elements, which are stored in state update buffer 6b.

Further, in preferred embodiments and in a preferred terminology, the virtual network function 1 at the destination node 3 is initialized based on the snapshot of the state taken at the source node 2 and instantiated as soon as the state of the virtual network function 1 implemented by the destination node 3 is sufficiently updated based on the state update elements received by the destination node 3 from the source node 2.

The update of the state of the virtual network function 1 implemented at the destination node 3 by the state update elements received from the source node 2 might be termed synchronization of the state, in other words the state of the virtual network function 1 to be implemented by the destination node 3 is synchronized to the state of the virtual network function 1 implemented by the source node 2 to have same state at the moment when the virtual network function migration is completed, which means in particular that packets flows processed by the virtual network function 1 at the source node 2 before migration are processed by the virtual network function 1 at the destination node 3 after migration.

In preferred embodiments, after the buffered state update elements, which are used for updating the state of the virtual network function 1 initialized at the destination node 2, decrease below a predetermined threshold, the destination node 3 signals 8a to the controller 8, in particular by sending a message to controller 8, wherein this message might be termed "redirect message". By this redirect message, the controller 8 is caused to redirect the data flows (coming e.g. from the above mentioned client) which have been directed to the source node 2 towards the destination node 3 (thus coming from, e.g., the client to the destination node 3 instead of coming from the client to the source node 2).

Further, preferably, the controller 8 signals to the source node 2 to stop processing of data packets 5, which are received at the source node 2, more specifically which are received at the source node 2 after the snapshot has been made. Data packets 5 might thus be regarded as a particular part of the data flow 10a.

Further, preferably, the controller 8 signals 8b to the destination node 3 to start processing of the data traffic at the destination node 3.

Preferably, the source node 2 is signalled to stop processing of data packets by injection of a drain packet to the datapath to the source node 2, in particular to the last packet to the source node 2, by the controller 8. Preferably, upon reception of the drain packet, the source node 2 signals the destination node, that updating has been finished, in particular by closing the state update stream. Preferably, the following data packets (coming next to the last data packets 5 directed towards the source node 2) are now directed towards the destination node 3, wherein the following data packets are referenced by 5*.

Preferably, the data packets 5 are part of data flows 10a, the data packets 5* are part of data flows 10a*.

Preferably, what has been described with reference to data packets 5 and 5* applies more generally to the data flows 10a and 10a*, respectively.

Preferably, as described above, the signalling to the source node 2 is implemented by means of a drain packet. The controller 8 injects a drain packet to the source node 8. A drain packet is defined as a packet which causes the source node 2 to stop transmitting state update elements to the destination node 3. Preferably, upon receiving the drain packet, the source node 2 closes the state update stream to the destination node 3. Preferably, thereby the destination node 3 is notified about the end of state updates.

In a preferred embodiment, the virtual network function 1 starts receiving packets on the dataplane at the destination node 3 after all state update elements buffered at the state update buffer 6b at the destination node 3 have been installed (used for update), wherein in preferred embodiments there might still be a small threshold of state update elements currently underway, namely from the source node 2 to the destination node 3.

As mentioned above, in a preferred embodiment, after the buffered state update elements, which are used for updating the state of the virtual network function 1 initialized at the destination node 3, decrease below a predetermined threshold, the destination node 3 sends a redirect message to the controller 8 (the effect of the redirect message has been described above).

Thus, preferably, the redirect message is triggered by an underrun of the buffered state update elements below a predetermined threshold. In particular, the predetermined threshold in regard of the buffered state update elements is defined as an underrun of the state update buffer, preferably as an underrun of "d" state update elements, wherein "d" is a predefined parameter, e.g. 10, 100, 1000, 10000.

Preferably, the number of buffered state update elements is determined by a quantity of state update elements stored in the state update buffer 6b at the destination node 3 and compared to a predetermined threshold. Preferably, if the number of buffered state update elements underrun the predetermined threshold, e.g. 10, 100, 1000, 10000, the destination node 3 signals to stop processing of data packets 5 at the source node 2 and additionally or alternatively to redirect one or more following data packets to the destination node 3 and/or the destination node 3 sends a message, in particular the redirect message, to the controller 8.

It is noted that, in preferred embodiments, as soon as the buffered update elements have been used to update the state, the buffered update elements might be taken out of the buffer. In this case, "buffered" means that the state update elements have been buffered before being used. In other embodiments, the buffered state update elements remain in the buffer after being used for update, however a pointer, which indicates a particular state update elements to be used for update, is incremented and thus indicates to the next state update element, as soon as said particular state update element has been used for update.

In a preferred embodiment, as soon as the controller 8 redirects the data flows 10a (comprising data packets 5) which before have been sent to the source node 2 towards the destination node 3 (the data flows being now determined data flows 10a\* instead of 10a) the destination node 3 receives the data packets 5\* of data flows 10a\*. Preferably, the first data packet of data packets 5\* is the first data packet following the last data packet of data packets 5. Therefore, packets 5\* might be termed as "following" data packets.

In a preferred embodiment, the destination node 3 receives data packets 5\* and stores data packets 5\* in data packet buffer 7b at the destination node 3.

In a preferred embodiment, the destination node 3, more specifically the virtual network function 1 of the destination node 3, processes the stored data packets 5\*, as soon as the destination node 3 has used all buffered state update elements for update of the state of the virtual network function 1 at the destination node 3 and additionally or in the alternative as soon as the destination node 3 does not receive any state update elements from the source node 2 any more.

Preferably, the destination node 3 is notified to process the stored data packets 5\* by the fact that the state update element stream from the source node 2 drains, which means ends (no more state update elements from the source node 2 coming any more).

In a preferred embodiment, the destination node 3 processes one or more of the data packets 5\* stored in the data packet buffer 7b at the destination node 3, while one or more state update elements are yet to be expected to be transmitted from the source node 2 to the destination node 3, and in particular are actually still being transmitted from the source node 2 to the destination node 3. The determination to process these one or more data packets 5\* is based on a comparison of the sequence numbers of these data packets 5\* with the respective sequence numbers of a data flow 10a\* being a TCP flow to which the data packets 5\* belong.

Preferably, for every data packet 5\* which is received by the destination node 3 and stored in the data packet buffer 7b at the destination node 3, it is determined, if the data packet 5\* can be processed without harming the in-order process.

In more detail, in preferred embodiments, the data packets 5\* are received and stored in the data packet buffer 7b at the destination node 3, before the state update element stream from the source node 2 to the destination node 3 has been completed, i.e. while the source node 2 is still transmitting state update elements to the destination node 3. For every data packet 5\* entering the data packet buffer 7b of the destination node 3, the virtual network function 1 at the destination node 3 determines, if the data packet 5\* can be processed without harming the in-order process. In case the virtual network function 1 determines that the packet 5\* can be processed without harming the in-order process, the packet 5\* is processed without waiting for the state update element stream to close, this means for the last state update element to be transmitted.

Preferably, the determination by the destination node 3, if an incoming data packet 5\* can be processed without harming the in-order process, is implemented by a TCP sequence number of the data flow 10a\* to which the data packets 5\* belongs. For example, in a TCP stream, the virtual network function 1 of the destination node 3 remembers (stores) the last sequence number of a particular flow seen, and returns "true" to the question, whether the data packet 5\* can be processed without harming the in-order process, in case the entering data packet's sequence number is the next one to be expected. In the latter case the data packet 5\* is processed without waiting for the state update element stream to close. Therefore, the delay of the processing of the data packets at the destination node 3 can be decreased, while the dataplane at the source node 2 is drained.

In a preferred embodiment, the migration is a complete migration. In this case, after instantiating, this means initialization and sufficiently update (using the buffered state update elements) of the virtual network function 1 at the destination node 3, a totality of data packet traffic 10a which has been processed 11 before the migration by the source node 2 is redirected to the destination node 3 to be processed 12 by the destination node 3, the data traffic being now referred to 10a\*. Reference sings 10a, 10b depict the incoming and outgoing data traffic before migration and reference signs 10a\*, 10b\* depict the incoming and outgoing data traffic after migration of the virtual network function 1.

In a preferred embodiment, the migration is a partial migration. In this case, a part of the data packet traffic 10a, 10b processed 11 before the migration by the source node 2 to the destination node 3 is determined to become the data traffic 10*a\, 10*b\ to be processed 12 by the destination node 3.

Preferably, what has been described with reference to the state update elements, applies analogously, if in preferred embodiments, state update byte vectors are used as state update elements. A state update byte vector might also be termed state update vector. Therefore, preferably, while the embodiments have been described with reference to the feature "state update element(s)", the embodiments might similarly be implemented with reference to the feature "state update byte vector(s)", unless it is derivable from the context that exclusively state update elements or exclusively state update byte vectors are meant.

Preferably, a state update element, in particular a state update byte vector, is a data unit comprising a compact VNF-specific byte representation. Preferably, the state update element, in particular the state update byte vector, is produced by the VNF of the source node 2 to transmit the change of the state of the virtual network to the destination node 3.

In a preferred embodiment, a state update byte vector is a compact VNF-specific byte representation which does not have a packet header structure.

Furthermore it is possible, that in a further preferred embodiment, a state update element, in particular a state update byte vector, has a packet header structure and a packet payload.

In a preferred embodiment, the virtual network function 1 is a network address translation. The state update elements which encode the state change might encode the change of a table association at the start of a session and at the end of a session (only around 20 to 30 bytes per newly established session).

In a preferred embodiment, the virtual network function 1 is a (Signature based) Intrusion Detection. In this case, a state update element encodes the information about only suspicious packets entering the virtual network function 1, and in particular only those packets that might be relevant when analyzing subsequent packets.

In preferred embodiments, more precisely usually, the destination node 3 receives one or more of the state update elements before receiving the snapshot of the state. This is, because the snapshot of the state contains much more information and thus requires more bandwidth and thus transmission time as a state update element. Then, after the snapshot has been made at the source node 2, the transmission of the snapshot to the destination node 3 might be started, however might take for example one second, until the snapshot is completely transmitted to the destination node 3. During this time after the snapshot has been made, following data packets 5 are received at the source node 2 causing a change of the state. As described above, the change of the state of the virtual network function 1 of the source node 2, caused by such a data packet is encoded 17 into a state update element, thus into a plurality of state update elements encoding 17 the respective state change caused by a plurality of data packets 5. As described, the update state elements are transmitted to the destination node 3 to update the virtual network function 1 implemented by the destination node 3. The transmission of a state update element might take e.g. only one millisecond or even only one microsecond. Since the snapshot has not been received by the destination node 3, the virtual network function 1 has not yet been initialized at the destination node 3 and thus can not yet be updated by the state update elements. Therefore, the state update elements are buffered in the state update buffer 6*b* at the destination node 3, until the virtual network function 1 has been initialized at the destination node 3 based on the snapshot received from the source node 2 and the buffered state update elements can be used for update the initialized virtual network function 1 at the destination node 3.

In preferred embodiments, the processing 11 at the source node 2 comprises a plurality of processes (e.g. 60 000 processes) and thus the state snapshot comprises the snapshot of the state of the plurality of processes. In this case, the state snapshot, which is more precisely a snapshot of a plurality of states or in other words a plurality of state snapshots, comprises much more information and thus data and might take even more time to be transmitted to the destination node 3 which underlines the need to buffer the state update elements received at the destination node 3.

As described in detail above, for implementing the method for migrating a virtual network function 1 from a source node 2 to a destination node 3, the invention implements the aforementioned source node 2 and the aforementioned destination node 3.

The source node 2 is adapted to transmit a snapshot of a state of a virtual network function 1 implemented by the source node 2 to the destination node 3 and to transmit state update elements encoding 17*a* change of the state of the virtual network function 1 implemented by the source node 2 caused by processing of one or more data packets 5 received by the source node 2 since the snapshot.

The destination node 3 is adapted to receive a snapshot of a state of a virtual network function 1 implemented at the source node 2 and to receive 9 state update elements encoding 17 a change of the state of the virtual network function 1 implemented by the source node 2 caused by processing of one or more data packets 5 received by the source node 2 since the snapshot.

In a preferred embodiment, the source node 2 is implemented by a first physical node (e.g. computer, server) and the destination node 3 is implemented by a second physical node (e.g. computer, server). In preferred embodiments, the second physical node is identical to the first physical node. Alternatively (and usually) the second physical node is different from the first physical node.

In a preferred embodiment, the virtual network function 1 is implemented at the source node 2 by a virtual source instance and at the destination node 3 by a virtual destination instance.

The invention defines further a controller 8 which implements steps of the above described method, in particular signalling for synchronization of the migration.

In particular, the controller 8 might be adapted to send synchronization signalling to the source node 2 and/or the destination node 3. As soon as the virtual network function 1 has been initiated at the destination node 3 based on the state snapshot and sufficiently updated based on the state update elements (by using the buffered state update elements at the destination node 3), the controller receives a message which might be termed "redirect message" from the destination node 3. Due to reception of this message, the controller 8 redirects data traffic 10*a* which has been directed to the source node 2 towards the destination node 3 (the data traffic being now referenced 10*a\), further preferably the controller 8 signals 8*a* to the source node 2 to stop processing of the data traffic 10*a*, 10*b* and contemporaneously signals 8*b* to the destination node 3 to start processing of the data traffic 10*a\, 10*b\ by the destination node 3, more precisely by the virtual network function 1 which is migrated from the source node 2 to the destination node 3.

By this signalling the migration of the virtual network function 1 from the source node 2 to the destination node 3 is preferably synchronized avoiding loss of data packets to be processed, preferably avoiding disordering of packets, and preferably reducing jitter.

In a preferred embodiment, the destination node 3 sends one or more acknowledgment messages 13 to the source node 2 to confirm reception of the state snapshot and/or to confirm reception of the state update elements and/or to confirm migration of the virtual network function 1 from the source node 2 to the destination node 3. One or more of these acknowledgment messages 13 might also or alternatively be sent by the controller 8, in case the controller 8 has knowledge about the respective reception. Further, one or more of these acknowledgment messages 13 might also be sent from the destination node 3 via the controller 8 to the source node 2, this means the controller 8 forwards the respective acknowledgment messages 13 sent by the destination node 3 to the source node 2.

One or more of the steps of the described method might be and will usually be implemented by a computer program product which is adapted to execute the described method when executed on a computer. Also, more than one computer might be used.

In particular, the controller 8 might be implemented as a computer. In more detail, the controller 8 may be implemented as a single unit, a stand-alone device, or within a database, integrated in a computer and/or within a computer network. The controller 8 may be implemented through the use of hardware, software and/or hardware capable of executing software in association with appropriate software.

More specifically, the controller 8 can be comprised or implemented by circuit-based processes, including possible implementation as a single integrated circuit, such as an ASIC (=Application Specific Integrated Circuit) or such as an FPGA (=Field Programmable Gate Array), a multi-chip module, a single card, or a multi-card circuit pack. The functions of the controller 8 may be implemented as processing blocks in a software program. Such software may be employed in a digital signal processor, micro-controller, or general-purpose computer implemented as a single device or integrated in a computer network.

The controller 8 may comprise program code embodied in tangible media, such as magnetic recording media, optical recording media, solid state memory, floppy diskettes, CD-ROMs, hard drives, or any other machine-readable storage medium, wherein, when the program code is loaded into and executed in the controller 8, the controller 8 becomes an apparatus used for practicing the invention.

Preferably, the source node 2 and/or the destination node 3 contain also a controller for implementing the steps of the source node 2 and destination node 3, respectively, wherein such a controller might be similarly implemented as the controller 8 described above. In a preferred embodiment, the controller 8 which has been described as a separate device, might be integrated in one or the source node 2 or destination node 3, preferably in the destination node 3. Further, the destination node 3 might implement one or more of the steps described above as implemented by the controller 8.

In a preferred embodiment, the source node 2 implements an interface 18a, over which the state update elements are sent to the destination node 3. The interface 18a might be generic or VNF specific. Preferably, the interface 18a is configured in regard to specific VNF implementations to migrate their state, in particular by sending state update elements over said interface 18a.

Similarly, in a preferred embodiment, the destination node 3 implements an interface 18b to receive the state update elements sent by the source node 2. The interface 18b might be generic or VNF specific. Preferably, the interface 18b is configured in regard to specific VNF implementations to migrate their state, in particular by receiving state update elements over said interface 18b.

The invention preferably proposes a new mechanism to synchronize the state of the virtual network function at the source node (preferably termed source instance) and the state of the virtual network function at the destination node (preferably termed destination instance) during the critical time of full or partial VNF migration, e.g., triggered by a scale-out/in event (partial migration) or when moving a function to another physical node, preferably termed physical instance, (full migration) for better performance/resource utilization. The invention could be regarded as a platform which provides a generic interface to the VNF, which allow the specific VNF to create state update elements (preferably also termed delta state elements) which encode the state change that is caused by processing a packet in the VNF, instead of sending a duplicate of the entire packet. For example, the delta state of a packet counter in a firewall simply encodes an increment of one instead of sending a duplicate of the full packet to the destination node. This mechanism is a substantial improvement to the VNF state synchronization mechanism proposed by P2P-OpenNF and enables VNF migration/replication across networks with limited bandwidth such as the network between datacenters.

Preferably, for many network functions, the data that needs to be transmitted is only a small fraction of the total packet sent. To keep the architecture NF (Network Function)—independent, every network function implements an interface which allows it to output (smaller) state update elements/vectors upon every relevant state change (likely triggered by incoming packets) and which accepts incoming state update elements/vectors to change the destination network function's state accordingly.

The invention provides the advantage of a substantial reduction of information exchanged during migration/replication/scale-out/scale-in of a VNF. This reduction is a key enabler for the operation of VNFs in a service provider or edge cloud. With this invention, cloud providers can easily manage a service including its VNFs across different data center sites. VNFs can be fully or partly migrated/replicated to new sites as needed to scale or move a service to serve customer demand.

Because of the significant traffic reduction on the link between the source and destination node (instance) during the synchronization phase of the state migration procedure, a significant reduction in the duration of the migration is achieved by the invention. This substantial increase in efficiency enables the seamless migration/replication of VNFs across data centers and data centers and customer premises. This technology is a foundation for the vision of a distributed edge cloud that can be seamlessly managed by the cloud operator.

The invention claimed is:

1. A method for migration of a virtual network function (VNF) from a source node to a destination node, the method comprising:
  receiving, by the destination node, a snapshot of a state of the virtual network function implemented by the source node;
  receiving, by the destination node, state update elements encoding a change in the state of the virtual network function implemented by the source node caused by processing of one or more data packets received by the source node since the snapshot;

storing the state update elements in a state update buffer at the destination node; and signalling, by the destination node, to stop processing of data packets at the source node and to redirect one or more following data packets to the destination node, in response to an amount of the state update elements stored in the state update buffer decreasing below a threshold.

2. The method of claim 1, further comprising:
initializing the virtual network function at the destination node based on the snapshot.

3. The method of claim 1, further comprising:
updating the state of the virtual network function based on the state update elements stored in the state update buffer, the virtual network function initialized at the destination node based on the snapshot.

4. The method of claim 3, wherein the threshold is based on a quantity of the state update elements.

5. The method of claim 3, further comprising:
storing the one or more following data packets in a data packet buffer at the destination node; and
processing the one or more following data packets by the virtual network function at the destination node after all state update elements received from the source node and stored in the state update buffer at the destination node have been used to update the virtual network function at the destination node.

6. The method of claim 3, further comprising:
storing the one or more following data packets in a data packet buffer at the destination node; and
processing the one or more following data packets by the virtual network function at the destination node, prior to receipt of one or more state update elements at the destination node, based on a determination that the one or more following data packets can be processed without harming an in-order process.

7. The method of claim 3, wherein
the migration is a complete migration; and
the method further includes redirecting a totality of data packet traffic processed before the migration by the source node to the destination node to be processed by the destination node.

8. The method of claim 1, wherein
the state update elements are state update byte vectors; and
the state update byte vectors are compact VNF-specific byte representations that do not have a packet header structure.

9. The method of claim 1, further comprising:
receiving one or more of the state update elements at the destination node before receiving the snapshot of the state.

10. The method of claim 1, wherein
the source node is implemented by a first physical node and the destination node is implemented by a second physical node, which is different from the first physical node; and
the virtual network function is implemented at the source node by a virtual source instance and at the destination node by a virtual destination instance.

11. The method of claim 6, wherein the processing comprises:
processing the one or more following data packets by the virtual network function at the destination node based on a comparison of sequence numbers of the one or more following data packets with respective sequence numbers of a TCP flow to which the one or more following data packets belong.

12. The method of claim 1, wherein
the migration is a partial migration; and
the method further includes redirecting a part of data packet traffic processed before the migration by the source node to the destination node to be processed by the destination node.

13. The method of claim 1, wherein the receiving state update elements comprises:
receiving the state update elements encoding the change in the state of the virtual network function without receiving complete duplicates of the one or more data packets received by the source node since the snapshot.

14. A source node comprising:
at least one processor; and
at least one memory including computer program code, the at least one memory and the computer program code configured to, with the at least one processor, cause the source node to
transmit a snapshot of a state of a virtual network function implemented by the source node to a destination node,
transmit state update elements encoding a change in the state of the virtual network function implemented by the source node caused by processing of one or more data packets received by the source node since the snapshot, and
receive a signal from the destination node to stop processing of data packets and to redirect one or more following data packets to the destination node, in response to an amount of state update elements stored in a state update buffer at the destination node decreasing below a threshold.

15. A non-transitory computer-readable medium storing computer program code that, when executed on a computer at a destination node, causes the destination node to perform the method of claim 1.

16. The source node of claim 14, wherein the at least one memory, the computer program code, and the at least one processor are configured to cause the source node to:
create the snapshot; and
redirect concurrent writes to the state of the virtual network function to other data structure regions during the creating the snapshot.

17. A destination node comprising:
at least one processor; and
at least one memory including computer program code, the at least one memory and the computer program code configured to, with the at least one processor, cause the destination node to
receive a snapshot of a state of a virtual network function implemented by a source node,
receive state update elements encoding a change in the state of the virtual network function implemented by the source node caused by processing of one or more data packets received by the source node since the snapshot, and
store the state update elements in a state update buffer at the destination node,
signal to stop processing of data packets at the source node and to redirect one or more following data packets to the destination node in response to an amount of the state update elements stored in the state update buffer decreasing below a threshold.

18. A method for migration of a virtual network function (VNF) from a source node to a destination node, the method comprising:

receiving, by the destination node, a snapshot of a state of the virtual network function implemented by the source node;

receiving, by the destination node, state update elements encoding a change in the state of the virtual network function implemented by the source node caused by processing of one or more data packets received by the source node since the snapshot;

storing the state update elements in a state update buffer at the destination node;

updating the state of the virtual network function based on the state update elements stored in the state update buffer, the virtual network function initialized at the destination node based on the snapshot;

signalling to stop processing of data packets at the source node and to redirect one or more following data packets to the destination node, after the state of the virtual network function has been updated with an amount of the state update elements stored in the state update buffer;

storing the one or more following data packets in a data packet buffer at the destination node; and processing the one or more following data packets by the virtual network function at the destination node, prior to receipt of one or more state update elements at the destination node, based on a determination that the one or more following data packets can be processed without harming an in-order process.

\* \* \* \* \*